(12) United States Patent
Hoshino et al.

(10) Patent No.: US 8,565,567 B2
(45) Date of Patent: Oct. 22, 2013

(54) MULTI-MODE OPTICAL FIBER

(75) Inventors: Sumio Hoshino, Yokohama (JP);
Kazuhiro Yonezawa, Yokohama (JP)

(73) Assignee: Sumitomo Electric Industries, Ltd., Osaka-shi, Osaka (JP)

( * ) Notice: Subject to any disclaimer, the term of this patent is extended or adjusted under 35 U.S.C. 154(b) by 155 days.

(21) Appl. No.: 13/303,747

(22) Filed: Nov. 23, 2011

(65) Prior Publication Data
US 2013/0129291 A1   May 23, 2013

(51) Int. Cl.
*G02B 6/028* (2006.01)

(52) U.S. Cl.
USPC ............................... 385/124; 385/142

(58) Field of Classification Search
USPC .................. 385/123–124, 141–143
See application file for complete search history.

(56) References Cited

U.S. PATENT DOCUMENTS

| | | | |
|---|---|---|---|
| 5,044,716 A * | 9/1991 | Berkey | 385/51 |
| 6,292,612 B1 | 9/2001 | Golowich et al. | |
| 6,434,309 B1 | 8/2002 | Abbott, III et al. | |
| 6,535,679 B2 * | 3/2003 | Yokoyama et al. | 385/127 |
| 6,724,965 B2 | 4/2004 | Abbott, III et al. | |
| 6,798,962 B2 | 9/2004 | Berkey et al. | |
| 7,593,612 B2 * | 9/2009 | Shimotakahara | 385/128 |
| 7,787,731 B2 | 8/2010 | Bookbinder et al. | |
| 7,865,050 B1 | 1/2011 | Sun | |
| 2005/0063663 A1 * | 3/2005 | Anderson et al. | 385/142 |
| 2009/0154888 A1 | 6/2009 | Abbott, III et al. | |
| 2010/0028020 A1 | 2/2010 | Gholami et al. | |
| 2010/0067858 A1 | 3/2010 | Kim et al. | |
| 2010/0098431 A1 | 4/2010 | Donlagic | |
| 2010/0272406 A1 | 10/2010 | Bookbinder et al. | |
| 2011/0058781 A1 | 3/2011 | Molin et al. | |
| 2011/0064367 A1 | 3/2011 | Molin et al. | |
| 2013/0089296 A1 * | 4/2013 | Hoshino et al. | 385/123 |

FOREIGN PATENT DOCUMENTS

| | | |
|---|---|---|
| JP | 62-176941 | 8/1987 |
| JP | 2-81004 | 3/1990 |
| JP | 2002-53344 | 2/2002 |
| JP | 2004-93935 | 3/2004 |

* cited by examiner

*Primary Examiner* — Daniel Petkovsek
(74) *Attorney, Agent, or Firm* — Drinker Biddle & Reath LLP

(57) ABSTRACT

The present invention relates to a multi-mode optical fiber having a structure which can be produced with good stability with a communication bandwidth broader than that in the conventional structures, and in which both $GeO_2$ and chlorine are added to a core thereof, and chlorine is also added to a cladding thereof. The cladding contains chlorine such that the average chlorine concentration therein becomes higher than the average chlorine concentration in the core.

3 Claims, 8 Drawing Sheets

MULTI-MODE OPTICAL FIBER

BACKGROUND OF THE INVENTION

1. Field of the Invention

The present invention relates to a multi-mode optical fiber.

2. Related Background Art

Multi-mode optical fibers are known to have transmission loss higher than that of single-mode optical fibers for long-haul optical communication because of the structure thereof. Meanwhile since the multi-mode optical fibers are easy to connect and make it possible to construct easily a network by using devices with low required performance, such fibers have been widely used in applications with local area information communication such as LAN (Local Area Network).

Recently, the techniques for reducing the transmission loss in the above-described multi-mode optical fibers and the expansion of communication bandwidth (transition to a broadband communication) have been actively researched with the object of improving signal quality in the above-described local area information communication.

SUMMARY OF THE INVENTION

The present inventors have examined a technique for producing broadband multi-mode optical fibers with good stability. In the present specification, the expression "optical fiber" means "multi-mode optical fiber", unless specifically stated otherwise.

Thus, in order to manufacture a broadband multi-mode optical fiber with good stability, it is necessary to match accurately the refractive index profile in the diametric direction of the fiber with the desired shape. In order to obtain the desired shape of refractive index profile, firstly, it is necessary to add $GeO_2$ to obtain the correct concentration in the diametric direction, but such a measure is not always sufficient. For example, in an optical fiber obtained after drawing a preform, the refractive index profile slightly varies under the effect of residual stresses inside the optical fiber. In this case, it is important to reduce somehow the effect of residual stresses on refractive index fluctuations or maintain the same profile at all times in the optical fiber production process. The residual stresses are affected by tension applied to the optical fiber when the preform is drawn and solidification conditions of the drawn optical fiber. It would be desirable to reduce the residual stresses to zero, but in fact it is difficult. For example, when the optical fiber is cooled after drawing, the optical fiber temperature decreases from the surface of the optical fiber toward the interior thereof, and glass serving as a fiber material solidifies as the fiber cooling process proceeds, and as a result, stresses can remain inside the optical fiber under certain solidification conditions. In particular, since $GeO_2$ has been added to the core and the expansion coefficient of the core is higher than that of the cladding, the core shrinks significantly during fiber cooling and stresses caused by such shrinking also remain in the obtained optical fibers.

With consideration for the above-described facts, the inventors have discovered that the timings of glass solidification in sections along the diametric direction can be brought very close to each other by purposefully controlling the chlorine concentration profile in the multi-mode optical fiber that is being produced. This finding led to the creation of the present invention.

The present invention has been developed to eliminate the problems described above. It is an object of the present invention to provide a multi-mode optical fiber having a structure that can be produced with good stability with a communication bandwidth broader than that in the conventional structures.

The present invention relates to a multi-mode optical fiber of a GI (Graded Index) type, and such a multi-mode optical fiber is clearly distinguishable from single-mode optical fibers for long-haul transmission.

That is, a multi-mode optical fiber according to the present invention comprises a core extending along a predetermined axis and doped with germanium dioxide ($GeO_2$), and a cladding provided on an outer periphery of the core and having a refractive index lower than that of the core. In a refractive index profile in the diametric direction of the multi-mode optical fiber, an a value of a portion corresponding to the core is 1.9 to 2.2, a relative refractive index difference $\Delta$ (maximum refractive index difference of the core) of the core center with respect to a reference region in the cladding is 0.8 to 1.2%, and the core diameter $2a$ is 47.5 to 52.5 μm.

In the multi-mode optical fiber having the above-described structure, both of the core and the cladding are doped with chlorine, and in particular, the cladding is doped with chlorine such that the average chlorine concentration in the cladding becomes higher than an average chlorine concentration in the core.

As described above, the core is doped with $GeO_2$, and consequently the glass viscosity of the core is reduced. Hence, in this multi-mode optical fiber, as a structure which brings the glass viscosity of the cladding closer to that of the core, chlorine is added to the cladding such that its average concentration is higher than the average concentration in the core. By means of this configuration, the difference in glass solidification temperatures between the core and the cladding after drawing a preform can be made small. As a result, residual stress within the multi-mode optical fiber obtained after drawing a preform is reduced, and the refractive index change after glass solidification can be made small.

Further, in the multi-mode optical fiber according to the present invention, it is preferable that the chlorine concentration in the cladding be substantially constant, or else increase, along a radial direction of the multi-mode optical fiber from the inner peripheral surface of the cladding closest to the core toward the outer peripheral surface of the cladding opposing the inner peripheral surface.

In the chlorine concentration profile along the diametric direction of the multi-mode optical fiber, when the portion corresponding to the cladding has a shape such that the chlorine concentration increases from the center of the multi-mode optical fiber along the radial direction, during the cooling process after drawing a preform, the timing of glass solidification is made closer in the inside region including the inner peripheral face of the cladding (region near the core) and in the outside region including the outer peripheral face. As a result, residual stress within the optical fiber can be reduced, and bandwidth stability of the multi-mode optical fiber can be realized as a result.

As described above, in the multi-mode optical fiber according to the present invention, the change in refractive index profile before and after drawing a preform is kept small, and consequently application to broadband mult-mode optical fibers in particular is possible. More specifically, the present invention can be applied to broadband multi-mode optical fibers called OM3 and OM4 that are stipulated by the International Standard ISO/IEC 11801. For example, the OM3 multi-mode optical fiber represents a fiber in which the bandwidth called a minimum effective bandwidth is equal to or greater than 2000 MHz·km and a bandwidth at full mode oscillation (OFL bandwidth stipulated by the International Standard IEC 60793-1-41) is equal to or greater than 1500 MHz·km at 850 nm and equal to or greater than 500 MHz·km at 1300 nm.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the scope of the invention will be apparent to those skilled in the art from this detailed description.

DESCRIPTION OF THE PREFERRED EMBODIMENTS

Figure 1A:
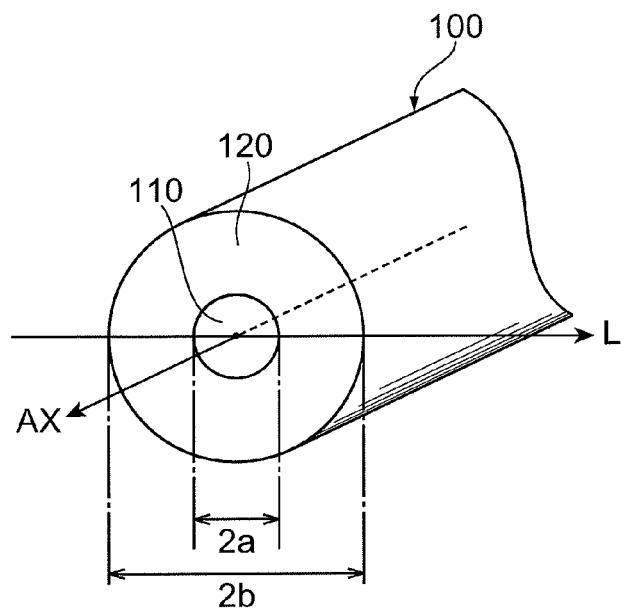
FIG. 1A shows a representative cross-sectional structure of a multi-mode optical fiber according to the present invention.

In the following, embodiments of the multi-mode optical fiber according to the present invention are explained in detail with reference to FIG. 1A to 1B, 2 to 4, 5A to 7D, and 8. In the description of the drawings, identical or corresponding components are designated by the same reference numerals, and overlapping description is omitted.

Figure 1B:
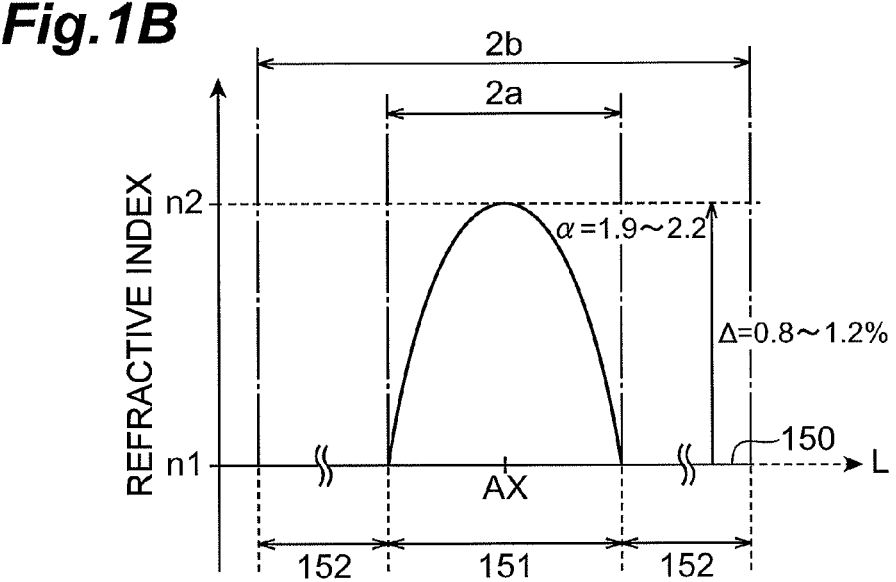
FIG. 1B shows a refractive index profile thereof.

FIG. 1A shows a representative cross-sectional structure of a multi-mode optical fiber according to the present invention, and FIG. 1B shows a refractive index profile thereof. In particular, the multi-mode optical fiber 100 (FIG. 1A) according to the present embodiment is a GI type multi-mode optical fiber mainly composed of silica glass, and comprises at least a core 110 extending along a predetermined axis (corresponding to the optical axis AX), and a cladding 120 provided on the outer periphery of the core 110. In the multi-mode optical fiber 100 shown in FIG. 1A, the core 110 is doped with $GeO_2$ for adjusting the shape of the refractive index profile, and has diameter $2a$ and a maximum refractive index of n2. The cladding 120 has diameter $2b$ and a refractive index n1 lower than that of the core 110. Apart from the $GeO_2$ described above, each of the core 110 and cladding 120 is doped with concentration-adjusted chlorine so as to form a desired concentration profile shape.

Further, the multi-mode optical fiber 100 according to the present embodiment has the refractive index profile 150 shown in FIG. 1B. The refractive index profile 150 shown in FIG. 1B indicates the refractive index at each portion on the line L orthogonal to the optical axis AX in FIG. 1A (corresponding to a diametric direction of the multi-mode optical fiber 100), and more specifically, shows the refractive index of different portions of the core 110 along the line L in the region 151, and the refractive index of different portions of the cladding 120 along the line L in the region 152.

In particular, the region 151 in the refractive index profile 150 of FIG. 1B has a dome shape such that the refractive index is maximum in the center of the core 110 coinciding with the optical axis AX. Hence, the concentration of $GeO_2$, which is added to adjust the refractive index, also falls rapidly in moving from the center of the core 110 toward the cladding 120. The a value for regulating the dome shape is from 1.9 to 2.2. The relative refractive index difference Δ (maximum relative refractive index difference of the core 110 with respect to the cladding 120) of the center of the core 110 relative to the cladding 120 (a single layer in the example of FIG. 1A, serving as a reference region defining the relative refractive index difference) is from 0.8 to 1.2%, and the diameter $2a$ of the core 110 is from 47.5 to 52.5 µm.

Figure 2:
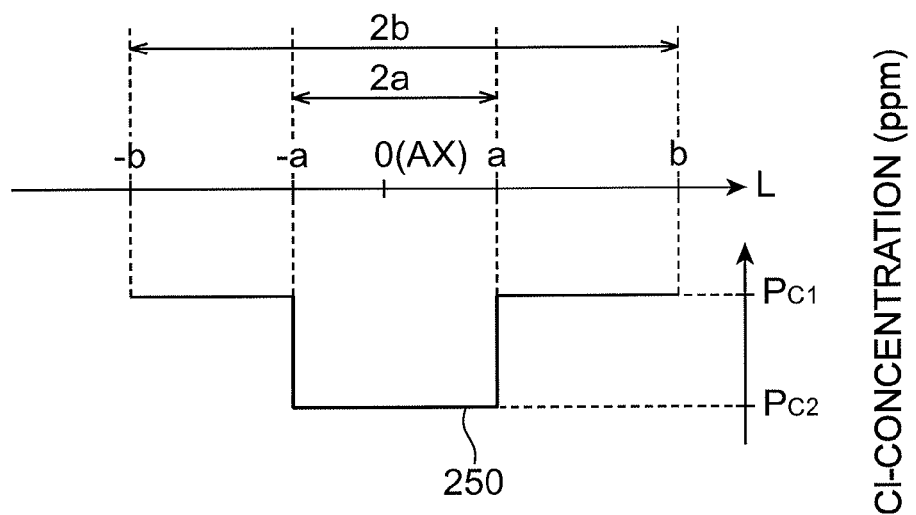
FIG. 2 is an example of a chlorine concentration profile applied to a multi-mode optical fiber according to the present invention.

The concentration profile of chlorine added to both the core 110 and the cladding 120 have the shape shown in FIG. 2. That is, as indicated by the chlorine concentration profile 250 shown in FIG. 2, the average Cl-concentration within the cladding 120 is higher than the average Cl-concentration profile within the core 110, and the Cl-concentrations in both the core 110 and the cladding 120 are intentionally controlled. In FIG. 2, the horizontal axis corresponding to the different portions on the line L of the core 110 with diameter $2a$ and the cladding 120 with diameter $2b$, and represents a coordinate with origin at the point of intersection with the optical axis.

As can be seen from FIG. 2, the chlorine concentration profile 250 in one example is distributed along the diametric direction (a direction orthogonal to the optical axis AX) of the multi-mode optical fiber 100; the shape is such that Cl-concentration (units: ppm) is substantially constant over the range from the optical axis AX to the distance a, that is, within the core 110 and the average Cl-concentration is $P_{C2}$. On the other hand, over the range of distance a to distance b from the optical axis AX, in other words, in the cladding 120 provided in the outer periphery of the core having a diameter $2a$, the Cl-concentration (units: ppm) is substantially constant, and its average Cl-concentration is $P_{C1}$ ($>P_{C2}$). As described above, the average Cl-concentration within the cladding 120 is higher than the average Cl-concentration within the core 110, so that the glass viscosity difference between the core 110 and the cladding 120 can be reduced. As a result, residual stresses within the multi-mode optical fiber obtained after the preform drawing are reduced, and the change in refractive index before and after glass solidification can be made small.

Figure 3:
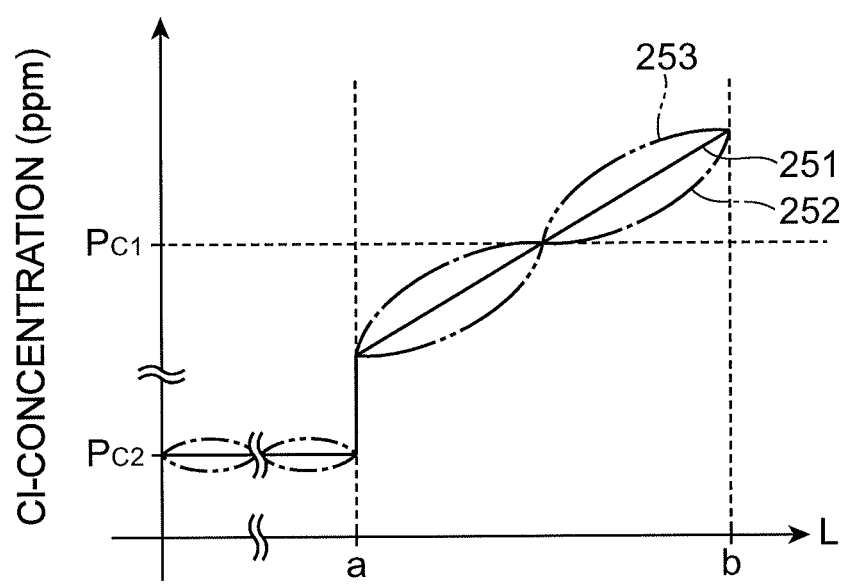
FIG. 3 is another example of a chlorine concentration profile applied to a multi-mode optical fiber according to the present invention.

FIG. 3 shows another example of a chlorine concentration profile applied to the multi-mode optical fiber 100. That is, the chlorine concentration profile within the cladding 120 may have a shape which rises from the inner peripheral surface of the cladding 120 closest to the core 110 toward the outer peripheral surface of the cladding 120 opposing the inner peripheral surface, along the radial direction of the multi-mode optical fiber 100. That is, the Cl-concentration within the cladding 120 may rise monotonically from the inner peripheral surface of the cladding 120 (that is, the surface separated by distance a from the optical axis AX along the radial direction of the multi-mode optical fiber 100) toward the outer peripheral surface of the cladding 120 (the surface separated by distance b from the optical axis AX along the radial direction of the multi-mode optical fiber 100). In this case also, the average Cl-concentration within the cladding 120 is $P_{C1}$. The Cl-concentration within the core 110 may fluctuate along the radial direction of the multi-mode optical fiber 100 from the optical axis AX. However, even if there is such a concentration fluctuation, the average Cl-concentration within the core 110 is $P_{C2}(<P_{C1})$.

For example, the concentration profile 251 shown in FIG. 3 has a shape with a constant rate of increase of the chlorine concentration (Cl-concentration) from the inner peripheral surface of the cladding 120 (the position at distance a from the optical axis AX) to the outer peripheral surface (the position at distance b from the optical axis AX). The concentration profiles 252 and 253 have shapes in which the rate of increase of the chlorine concentration (Cl-concentration) from the inner peripheral surface to the outer peripheral surface of the cladding 120 fluctuates. As the chlorine concentration profile in the cladding 120, any of the concentration profiles 251 to 253 may be adopted.

Next, as an example of a method of manufacture of a multi-mode optical fiber 100 according to the present embodiment, manufacture of preform for the multi-mode optical fiber according to the first embodiment, having the chlorine concentration profile shown in FIG. 2, is explained.

In order to obtain the multi-mode optical fiber 100, first an optical fiber preform 600 (see FIG. 7A and FIG. 8) is manufactured. The optical fiber preform 600 is obtained by first using a VAD (Vapor phase Axial Deposition) method to manufacture a core preform with $GeO_2$ (germanium dioxide) added, and after dehydration and sintering, stretching and other processes, then using the same VAD method to manufacture a peripheral portion on the outer periphery of the core preform obtained. The former core preform manufactured by the VAD method is the portion to become the core 110, having a refractive index profile with the a value after drawing of 1.9 to 2.2. The latter peripheral portion manufactured by the VAD method is the portion to become the cladding 120 after drawing.

Figure 4:
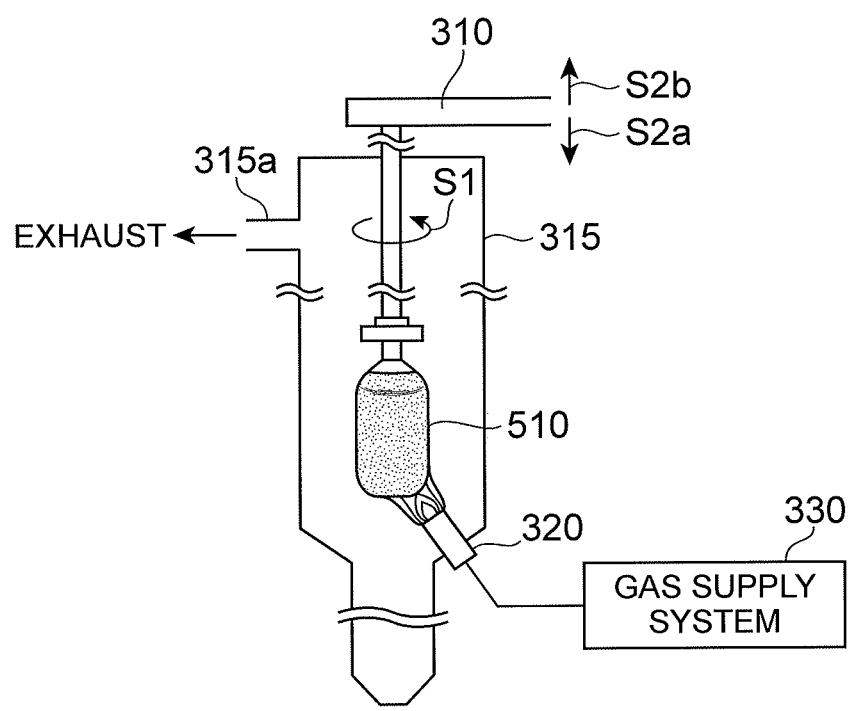
FIG. 4 is a view for explaining a VAD method and an apparatus configuration applied to core preform manufacturing processes.

Specifically, in the process to manufacture the core by the VAD method, a porous glass body 510 is formed by the soot deposition apparatus shown in FIG. 4. This soot deposition apparatus comprises at least a container 315 provided with a discharge port 315a, and a support mechanism 310 to support the porous glass body 510. That is, the support mechanism 310 is provided with a support rod which can rotate in the direction indicated by the arrow S1, and on the tip of this support rod is mounted a starting rod to induce growth of the porous glass body 510 (soot body).

The soot deposition apparatus of FIG. 4 is provided with a burner 320 to cause deposition of the porous glass body 510 (soot body); a desired starting material gas (for example $GeCl_4$, $SiCl_4$ or similar), combustion gases ($H_2$ and $O_2$), and carrier gas such as Ar, He or similar, are supplied to the burner 320 from a gas supply system 330.

During manufacture of the porous glass body 510, fine glass particles are generated in the flame of the burner 320 by a hydrolysis reaction of the starting material gas supplied from the gas supply system 330, and these fine glass particles are deposited on the lower surface of the starting rod. During this time, the support mechanism 310 first moves the starting rod mounted on the tip in the direction indicated by the arrow S2a, and then performs an upward-raising motion of the starting rod along the direction indicated by the arrow S2b (the longitudinal direction of the porous glass body 510) while rotating in the direction indicated by the arrow S1. By means of this operation, the porous glass body 510 grows in the downward direction of the starting rod on the lower surface of the starting rod, and at last a porous preform (soot preform) which is to become the core 110 is obtained.

Figure 5A:
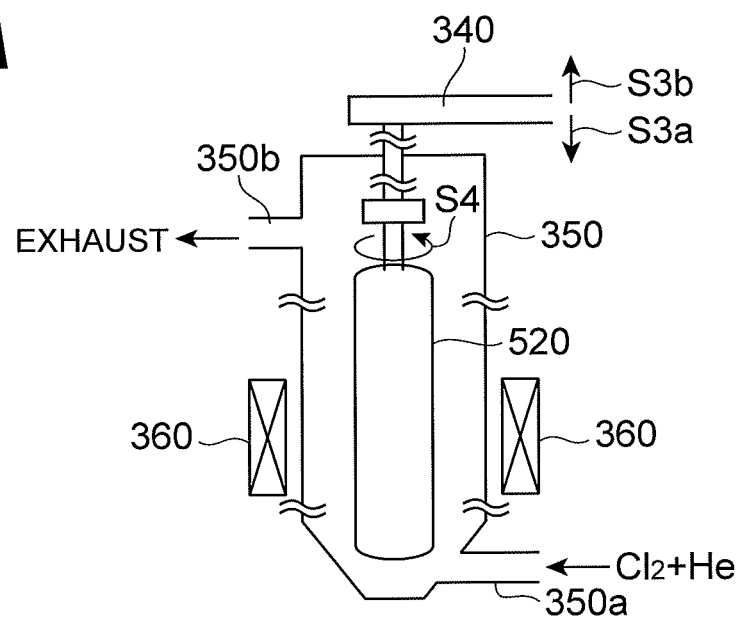
FIG. 5A is a view for explaining a dehydration process (chlorine addition process) and apparatus configuration.

Next, the dehydration process (chlorine addition process) shown in FIG. 5A is performed for the porous preform 510 manufactured by the VAD method described above. That is, the porous preform 510 is mounted within the heating container 350 provided with a heater 360 shown in FIG. 5A, and dehydration treatment in an atmosphere containing chlorine is performed. This heating container 350 is provided with an introducing port 350a and a discharge port 350b for the supply of a gas containing chlorine. During this dehydration process, the support mechanism 340 changes the position of the porous preform 510 relative to the heater 360 by moving the entire porous preform 510 in the directions indicated by the arrows S3a and S3b, while rotating about the central axis of the porous preform 510 in the direction of the arrow S4. Through this process, porous preform 520 to which has been added a predetermined amount of chlorine is obtained.

Figure 5B:
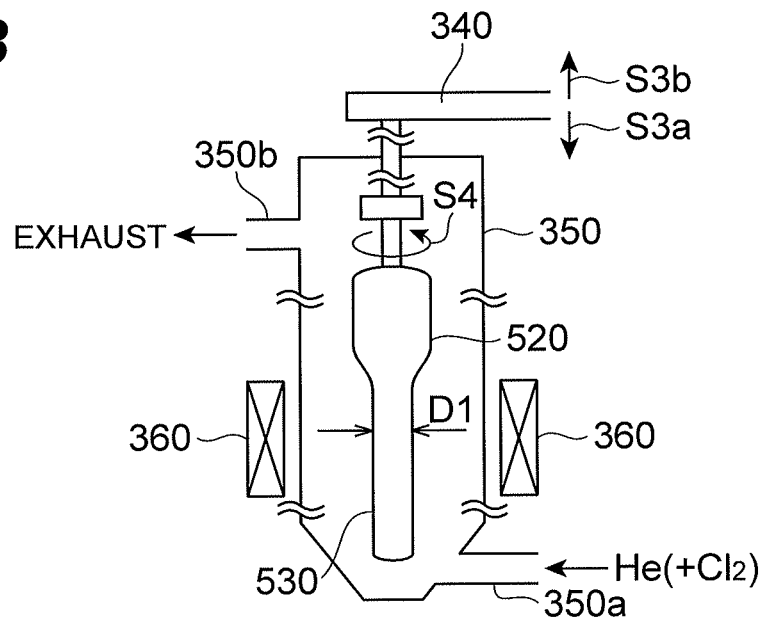
FIG. 5B is a view for explaining a sintering (rarefaction) processing and apparatus configuration.

The porous preform 520 obtained after the above-described dehydration process is next sintered within the heating container 350 described above (rarefaction). That is, as shown in FIG. 5B, the porous preform 520 is accommodated within the container 350 in a state of being supported by the support mechanism 340. At this time, the temperature within the container 350 (heater temperature) is set to approximately 1500° C., and He gas is being supplied into the container 350 via the introducing port 350a, without introducing chlorine gas.

During the sintering process, the support mechanism 340 moves the entirety of the porous preform 520 in the direction indicated by the arrow S3a while rotating the porous preform 520 about the central axis of the porous preform 520 in the direction indicated by the arrow S4, and by this means changes the position of the porous preform 520 relative to the heater 360. Through this process, a transparent glass body 530 of diameter D1 is obtained.

Figure 6A:
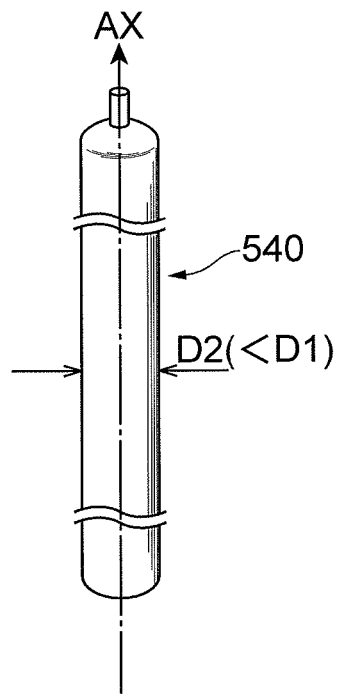
FIG. 6A shows a structure of a core preform after stretching.

By stretching the transparent glass body 530 manufactured as described above in the longitudinal direction thereof until the diameter is D2 (in this example, 20 mm), the core preform 540 shown in FIG. 6A is obtained.

The average Cl-concentration within the core preform 540 obtained was 280 ppm. The above-described porous preform manufacturing process, dehydration process, and sintering process can also be performed within the same container.

By using the VAD method to further form a glass region on the surface of the core preform 540 obtained by the above-described processes, a preform for a multi-mode optical fiber is finally manufactured.

Figure 6B:
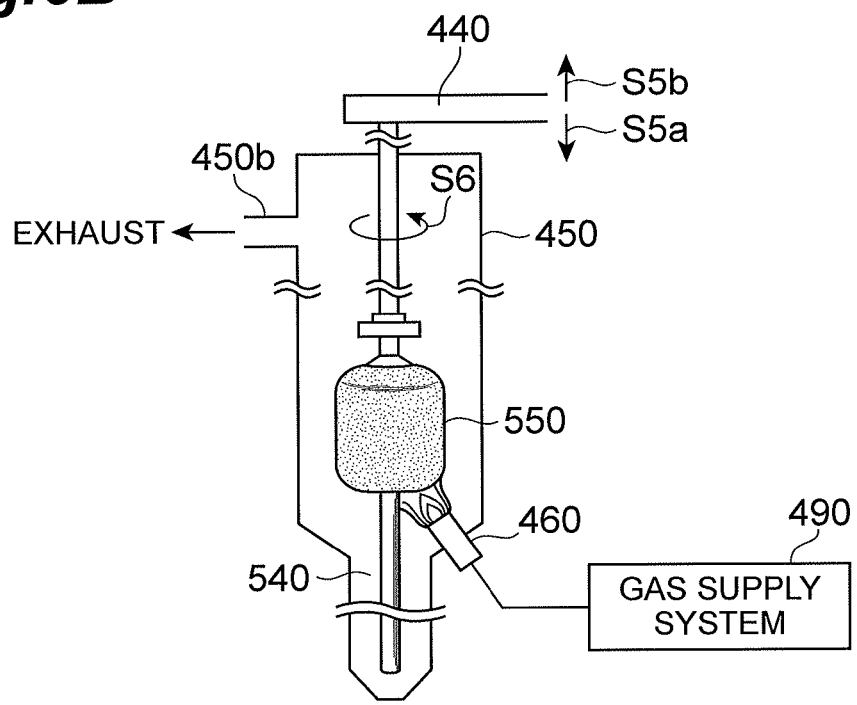
FIG. 6B is a view for explaining a VAD method and an apparatus configuration applied to manufacturing processes for a periphery portion of a preform which becomes the cladding.

Particularly, in the process of manufacturing the cladding by the VAD method, the porous glass body 550 is formed on the surface of the core preform 540 by the soot deposition apparatus shown in FIG. 6B (with structure similar to the soot deposition apparatus shown in FIG. 4). This soot deposition apparatus comprises at least a container 450 provided with a discharge port 450b, and a support mechanism 440 to support the core preform 540. That is, a support rod which can rotate in the direction indicated by the arrow S6 is provided on the support mechanism 440, and on the tip of this support rod is mounted the core preform 540 used to induce the growth, on the surface thereof, of the porous glass body 550 (soot body).

The soot deposition apparatus of FIG. 6B is provided with a burner 460 to cause deposition of a porous glass body 550 (soot body) on the surface of the core preform 540, and the desired starting material gas (for example $SiCl_4$ or similar), combustion gases ($H_2$ and $O_2$), and carrier gas such as Ar or He are supplied to the burner 460 from a gas supply system 490.

During manufacture of the porous glass body 550, fine glass particles are generated in the flame of the burner 460 by a hydrolysis reaction of the starting material gas supplied from the gas supply system 490, and these fine glass particles are deposited on the surface of the core preform 540. During this time, the support mechanism 440 first moves the core preform 540 mounted on the tip in the direction indicated by the arrow S5a, and then performs an upward-raising motion of the core preform 540 along the direction indicated by the arrow S5b (a longitudinal direction of the core preform 540) while rotating in the direction indicated by the arrow S6. By means of this operation, the porous glass body 550 grows in the downward direction of the core preform 540 on the lower surface of the core preform 540, and at last a porous preform (soot preform) which is to become the cladding 120 is obtained on the surface of the core preform 540.

Figure 7A:
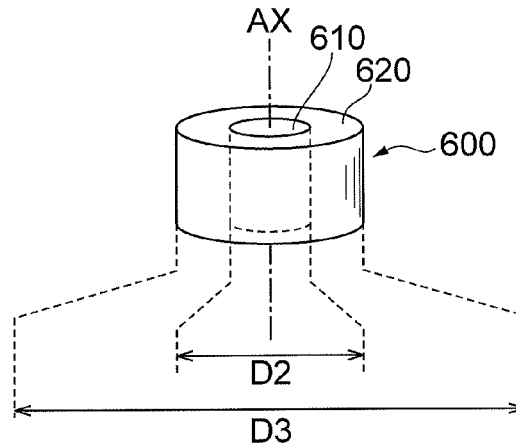
FIG. 7A shows a structure of an optical fiber preform obtained.

The porous preform obtained through the above-described processes is again subjected to a dehydration process (FIG. 5A) and a sintering process (FIG. 5B), to obtain a preform for a multi-mode optical fiber 600. In the process of sintering the porous preform, performed after the dehydration process, in order to effectively add chlorine to the peripheral region (soot body after dehydration) of the core preform 540, a gas mixture of chlorine gas ($Cl_2$) and He gas is supplied to the interior of the container 350, and the sintering process (glass rarefaction) is performed in the atmosphere of this gas mixture of chlorine gas and He gas. The optical fiber preform 600 obtained through the above-described processes comprises an inside region 610 which after drawing becomes the core 110, and a peripheral region 620 which becomes the cladding 120, as shown in FIG. 7A. The average Cl-concentration in the peripheral region 620 was 800 ppm.

Figure 8:
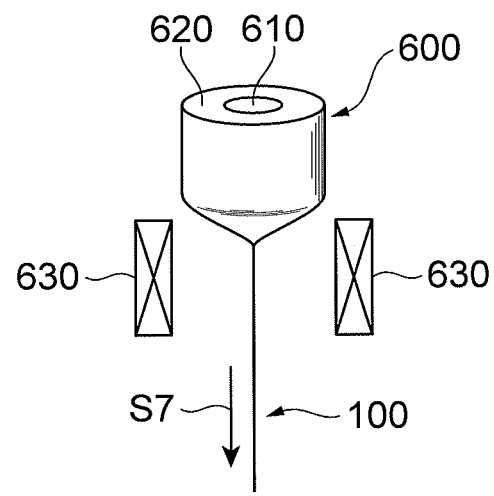
FIG. 8 is a view for explaining process and apparatus configuration for drawing of an optical fiber preform obtained.

The optical fiber preform 600 comprises a region which after drawing becomes the core 110, and a peripheral region which becomes the cladding 120, as shown in FIG. 8. In the drawing process shown in FIG. 8, one end of the optical fiber preform 600 is heated by a heater 630 while drawing in the direction indicated by the arrow S7, to obtain a multi-mode optical fiber 100 having the cross-sectional structure shown in FIG. 1A.

Figure 7B:
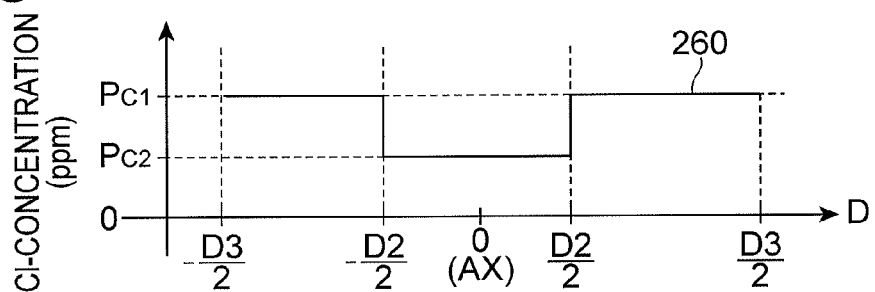
FIG. 7B shows a chlorine concentration profile along a diametric direction of the preform for a multi-mode optical fiber according to first embodiment.
Figure 7C:
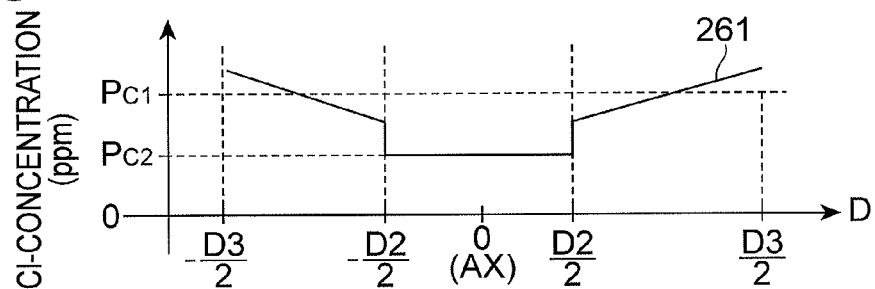
FIG. 7C shows a chlorine concentration profile along a diametric direction of a preform for a multi-mode optical fiber according to a second embodiment.
Figure 7D:
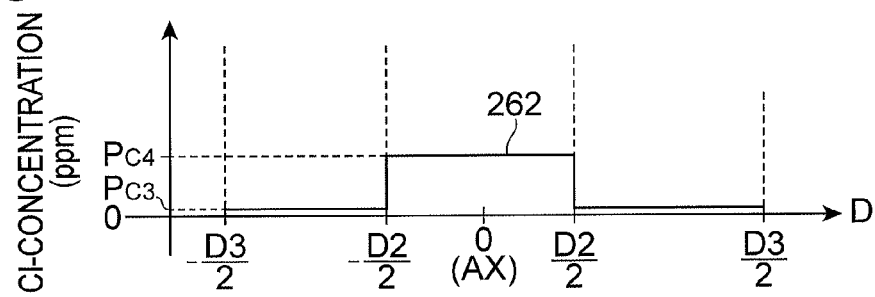
FIG. 7D shows a chlorine concentration profile along a diametric direction of a preform for a multi-mode optical fiber according to a comparative example prepared for comparison with the optical characteristics of the first and second embodiments.

In addition to the multi-mode optical fiber according to the above-described first embodiment, in order to further confirm the optical characteristics of various other multi-mode optical fibers (of a second embodiment and a comparative example), the inventors manufactured optical fiber preforms 600 having difference chlorine concentration profiles (FIG. 7B to FIG. 7D).

FIG. 7A shows a structure of the optical fiber preform 600 obtained, FIG. 7B shows a chlorine concentration profile 260 along a diametric direction of the preform for the multi-mode optical fiber according to the first embodiment, FIG. 7C shows a chlorine concentration profile 261 along a diametric direction of the preform for the multi-mode optical fiber according to the second embodiment, and FIG. 7D shows a chlorine concentration profile 262 along a diametric direction of the preform for the multi-mode optical fiber according to a comparative example prepared for comparison with the optical characteristics of the first and second embodiments.

In the chlorine concentration profile 260 along the diametric direction of the preform for the multi-mode optical fiber according to the first embodiment (FIG. 7B), Cl-concentration in the inside region 610 which is to become the core 110 is substantially constant along the radial direction of the preform, and Cl-concentration in the peripheral region 620 which is to become the cladding 120 is also substantially constant along the radial direction of the preform. In this chlorine concentration profile 260, the average Cl-concentration $P_{C2}$ in the inside region 610 was 280 ppm, and the average Cl-concentration $P_{C1}$ in the peripheral region 620 was 800 ppm.

The multi-mode optical fiber according to the first embodiment, which was finally obtained by drawing the optical fiber preform having the chlorine concentration profile 260 shown in FIG. 7B, had a minimum effective bandwidth of 2200 MHz·km and an OFL bandwidth at 850 nm of 1650 MHz·km, and was confirmed to be applicable as an OM3 multi-mode optical fiber.

In the chlorine concentration profile 261 (FIG. 7C) along the diametric direction of the preform for the multi-mode optical fiber according to the second embodiment, the Cl-concentration in the inside region 610 is substantially constant along the radial direction of the preform, but in the peripheral region 620 the Cl-concentration increases along the radial direction of the preform. However, in the chlorine concentration profile 261 also, the average Cl-concentration $P_{C2}$ in the inside region 610 was 280 ppm, and the average Cl-concentration $P_{C1}$ in the peripheral region 620 was 800 ppm.

The multi-mode optical fiber according to the second embodiment, which was finally obtained by drawing the optical fiber preform having the chlorine concentration profile 261 shown in FIG. 7C, was a broadband multi-mode optical fiber having a minimum effective bandwidth of 3100 MHz·km and an OFL bandwidth at 850 nm of 2950 MHz·km, and was confirmed to be applicable as an OM3 multi-mode optical fiber.

On the other hand, in the chlorine concentration profile 262 (FIG. 7D) along the diametric direction of the preform for the multi-mode optical fiber according to the comparative example, the Cl-concentration in the inside region 610 is substantially constant in the radial direction of the preform, but there is almost no chlorine added in the peripheral region 620 (chlorine gas was not introduced during sintering of the porous preform 550). Hence, in the chlorine concentration profile 262, the average Cl-concentration $P_{C4}$ of the inside region 610 was approximately equal to or less than $P_{C2}$, and the average Cl-concentration $P_{C3}$ in the peripheral region 620 was 10 ppm (<$P_{C4}$).

The multi-mode optical fiber according to the comparative example, which was finally obtained by drawing the optical fiber preform having the chlorine concentration profile 262 shown in FIG. 7D, had a minimum effective bandwidth of 1520 MHz·km and an OFL bandwidth at 850 nm of 1250 MHz·km, and consequently an OM3 multi-mode optical fiber was not obtained.

As described above, in accordance with the present invention, the difference in refractive index profile between the states before and after the preform drawing can be inhibited. Therefore, the present invention is particularly applicable to broadband multi-mode optical fibers. More specifically, the present invention can be applied to broadband multi-mode optical fibers called OM3 and OM4 that are stipulated by the International Standard ISO/IEC 11801.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A multi-mode optical fiber, comprising:
   a core extending along a predetermined axis and doped with germanium dioxide ($GeO_2$); and
   a cladding provided on an outer periphery of the core and having a refractive index lower than that of the core,
   wherein, in a refractive index profile in a diametric direction of the multi-mode optical fiber, an $\alpha$ value of a portion corresponding to the core is 1.9 to 2.2, a maximum relative refractive index difference $\Delta$ between the core and a reference region in the cladding is 0.8 to 1.2%, and a diameter $2a$ of the core is 47.5 to 52.5 µm; and
   wherein both of the core and the cladding are doped with chlorine, and the cladding is doped with chlorine such that an average chlorine concentration in the cladding becomes higher than an average chlorine concentration in the core.

2. The multi-mode optical fiber according to claim 1, wherein the chlorine concentration in the cladding increases along a radial direction of the multi-mode optical fiber, from an inner peripheral surface of the cladding closest to the core, toward an outer peripheral surface of the cladding opposing the inner peripheral surface thereof.

3. The multi-mode optical fiber according to claim 1, wherein the chlorine concentration in the cladding is substantially constant along a radial direction of the multi-mode optical fiber.

* * * * *